(12) United States Patent
Peng et al.

(10) Patent No.: US 12,387,306 B2
(45) Date of Patent: Aug. 12, 2025

(54) SYSTEM AND METHOD FOR MULTI-MODAL IMAGE ENHANCEMENT BASED ON TIME-ADJACENT IMAGE DATA

(71) Applicant: PING AN TECHNOLOGY (SHENZHEN) CO., LTD., Shenzhen (CN)

(72) Inventors: Bo Peng, Palo Alto, CA (US); Jui-Hsin Lai, Palo Alto, CA (US); Yuchuan Gou, Palo Alto, CA (US); Hang Zhou, Palo Alto, CA (US); Hongchen Liu, Palo Alto, CA (US); Mei Han, Palo Alto, CA (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 374 days.

(21) Appl. No.: 18/109,240

(22) Filed: Feb. 13, 2023

(65) Prior Publication Data

US 2024/0273696 A1    Aug. 15, 2024

(51) Int. Cl.
*G06T 7/00* (2017.01)
*G06F 16/532* (2019.01)
*G06F 16/583* (2019.01)
*G06V 10/26* (2022.01)

(52) U.S. Cl.
CPC .......... *G06T 7/0002* (2013.01); *G06F 16/532* (2019.01); *G06F 16/583* (2019.01); *G06V 10/26* (2022.01)

(58) Field of Classification Search
CPC . G06T 2207/10032; G06T 2207/20081; G06T 2207/20084; G06T 5/50; G06T 5/60; G06T 7/0002; G06V 10/26; G06V 10/764; G06V 10/774; G06V 10/82
See application file for complete search history.

(56) References Cited

PUBLICATIONS

MultiEarth—The Champion Solution for the Matrix Completion Challenge via Multimodal Regression and Generation, by Bo Peng et al (Year: 2022).*
Bo Peng et al., MultiEarth 2022—The Champion Solution for the Matrix Completion Challenge via Multimodal Regression and Generation, arXiv: 2206.08970v1 [cs.CV] Jun. 17, 2022, 4 pages.

* cited by examiner

*Primary Examiner* — Manuchehr Rahmjoo
(74) *Attorney, Agent, or Firm* — BAYES PLLC

(57) ABSTRACT

According to one aspect of the present disclosure, a method of image enhancement is provided. The method may include receiving, by at least one processor, a query for an enhanced image of a queried region obtained by a remote sensor at a queried time. The method may include obtaining, by the at least one processor, an image dataset associated with the queried region from the remote sensor. In response to the image dataset including a plurality of image data associated with the queried region obtained by the remote sensor, the method may include generating, by the at least one processor, the enhanced image of the queried region using an intra-modal regression model.

16 Claims, 5 Drawing Sheets

SYSTEM AND METHOD FOR MULTI-MODAL IMAGE ENHANCEMENT BASED ON TIME-ADJACENT IMAGE DATA

TECHNICAL FIELD

The present disclosure relates to image processing, and more particularly, to a system and method for image-enhancement in remote sensing.

BACKGROUND

Remote sensing, such as satellite remote sensing or aircraft remote sensing, offers unique capabilities for multi-modal, multi-spectral, and multi-temporal image acquisition for various earth observation missions including land cover classification, crop yield prediction, natural disaster monitoring, climate change analysis, etc. To that end, satellite or aircraft remote sensors may collect global scale remote sensing imagery with different modalities (e.g., electro-optical (EO) and synthetic-aperture radar (SAR)), spectral bands (e.g., visible and near-infrared bands), spatial resolutions (e.g., 10 m, 30 m, etc.), and revisiting periods (e.g., 7 days, 30 days, etc.).

SUMMARY

According to one aspect of the present disclosure, a method of image enhancement is provided. The method may include receiving, by at least one processor, a query for an enhanced image of a queried region obtained by a remote sensor at a queried time. The method may include obtaining, by the at least one processor, an image dataset associated with the queried region from the remote sensor. In response to the image dataset including a plurality of image data associated with the queried region obtained by the remote sensor, the method may include generating, by the at least one processor, the enhanced image of the queried region using an intra-modal regression model.

According to another aspect of the present disclosure, an apparatus for image enhancement is provided. The apparatus may include at least one processor. The apparatus may include a memory storing instructions which, when executed by at least one processor, cause the at least one processor to perform receiving a query for an enhanced image of a queried region obtained by a remote sensor at a queried time. The apparatus may include the memory storing instructions which, when executed by at least one processor, cause the at least one processor to perform obtaining an image dataset associated with the queried region from the remote sensor. The apparatus may include the memory storing instructions which, when executed by at least one processor, cause the at least one processor to perform in response to the image dataset including a plurality of image data associated with the queried region obtained by the remote sensor, generating the enhanced image of the queried region using an intra-modal regression model.

According to a further aspect of the present disclosure, a non-transitory computer-readable medium storing instructions for image enhancement is provided. The instructions, when executed by at least one processor, may cause the at least one processor to perform receiving a query for an enhanced image of a queried region obtained by a remote sensor at a queried time. The instructions, when executed by at least one processor, may cause the at least one processor to perform obtaining an image dataset associated with the queried region from the remote sensor. The instructions, when executed by at least one processor, may cause the at least one processor to perform, in response to the image dataset including a plurality of image data associated with the queried region obtained by the remote sensor, generating the enhanced image of the queried region using an intra-modal regression model. The instructions, when executed by at least one processor, may cause the at least one processor to perform, in response to the image dataset including a plurality of image data associated with the queried region obtained by different remote sensors, generating, by the at least one processor, the enhanced image of the queried region using an inter-modal generation model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

Figure 1:
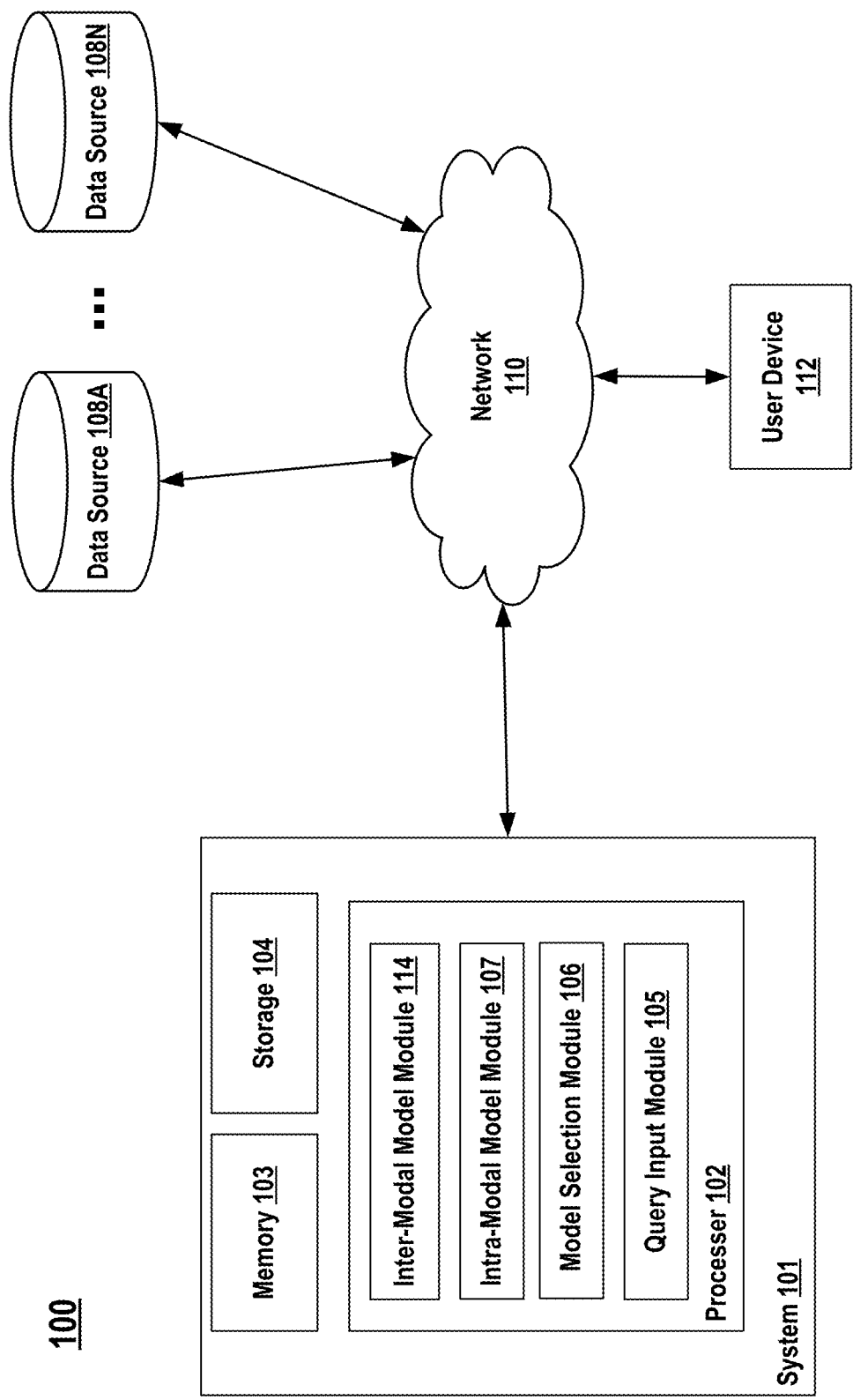
FIG. 1 illustrates a block diagram of an exemplary operating environment for a system configured to perform super-resolution image processing in remote sensing, according to embodiments of the disclosure.

Implementations of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Remote sensing can include a process of detecting and monitoring physical characteristics of an area by measuring its reflected and emitted radiation at a distance (e.g., from a satellite or an aircraft). Cameras can be installed in satellites or aircrafts to collect remotely sensed images (also referred to as remote sensing images).

As mentioned above in the BACKGROUND section, remote sensing (satellite or aircraft remote sensing) offers unique capabilities for multi-modal, multi-spectral, and multi-temporal image acquisition for various earth observation missions including land cover classification, crop yield prediction, natural disaster monitoring, climate change analysis, etc. To that end, satellites may collect global scale remote sensing imagery with different modalities (e.g., EO and SAR), spectral bands (e.g., visible and near-infrared bands), spatial resolutions (e.g., 10 m, 30 m, etc.), and revisiting periods (e.g., 7 days, 30 days, etc.).

However, such high-dimensional remote image data can exhibit sparsity in one or more of modality, band, location, and time due to various limitations from the satellite or aircraft revisiting periods, cloud coverage, sensor modality gap, etc. As a result, an image satisfying a requested or queried modality, spectral band, geographic location, and time may not be available.

To overcome these and other challenges, the present disclosure provides an exemplary multi-modal regression and generation image-enhancement technique that generates an enhanced image for a queried modality, spectral band, geographic location, and time. Due to the uncertainty of input image dataset and output image, the present disclosure adaptively defines the model pattern for each query based on the input image dataset.

For example, when the input image dataset includes time-adjacent image data of the same location captured using the same sensor or different sensors of the same modality, intra-modal regression may be used to generate the enhanced image. Intra-modal regression may generate the enhanced image or output query (e.g., [satellite$_i$, band$_i$, location$_i$, date$_i$]) using input data [[satellite$_i$, band$_p$, location$_i$, date$_p$], . . . , [satellite$_i$, band$_k$, location, date$_k$]]).

However, in some other embodiments, the input image dataset may not include time-adjacent image data of the same location captured using the same sensor or different sensors of the same modality. Here, the input image dataset may include image bands obtained using multiple modalities on different dates, whereas the output image (e.g., the enhanced image) is a single image band on a single date, a model pattern is defined by the combination of the input $X((m_1, d_1), \ldots, (m_i, d_i), \ldots, (m_B, d_B))$ and the output $y(m_j, d_j)$, where $(m_i, d_i)$ denote the modality $m_i$ (e.g., Sentinel2_B2) and the date $d_i$ (e.g., 2021_12_10), respectively. In instances when the input dataset lacks time-adjacent data from the same satellite and location, inter-modal imagery from the same location may be used to generate an enhanced-image using an inter-modal generation model. For example, an enhanced SAR image associated with satellite Sentienl-1 may be generated using EO imagery captured using EO image data captured using satellite Sentinel-2.

Corresponding to each adaptively-defined model pattern, the exemplary image processor retrieves training and testing data for model training and enhanced image generation for the query. In some embodiments, the input and output modalities in training data match those for the test query, and the input and output dates are within T days of those for the test query. This strategy may reduce the number of model patterns, which limits the training load for each model pattern. Some queries may share the same model pattern and are generated using the same model. The exemplary intra-modal model component described herein may implement neural networks or gradient boosting on decision trees for intra-modal test query regression. This may be achieved using a multi-layer perceptron (MLP) model, in one non-limiting example. For each model pattern, all available spectral bands may be used as the input features and the output query band as the regression target.

Due to the substantial modality gap between SAR and EO images, the exemplary inter-modal generation component may include a generative model based on a SPatially-ADaptivE (DE) normalization (SPADE) technique, which is a variant of the conditional generative adversarial network (cGAN) with spatially-adaptive normalization. SPADE uses a learnable spatially-adaptive transformation to modulate the normalization activations by leveraging the input semantic segmentation layout. Different from SPADE using the down-sampled image segmentation map as the conditional input, the present disclosure uses the original multi-spectral images from modality m; as the conditional input for generating an enhanced image for another modality $m_j$. Additional details of the exemplary multi-modal regression and generation image-enhancement technique are provided below in connection with FIGS. 1-5.

FIG. 1 illustrates an exemplary operating environment 100 for a system 101 configured to perform image-enhancement processing in remote sensing, according to some embodiments of the disclosure. Operating environment 100 may include system 101, one or more data sources 108A, . . . , 108N (also referred to as data source 108, individually or collectively), a user device 112, and any other suitable components. Components of operating environment 100 may be coupled to each other through a network 110.

In some embodiments, system 101 may be embodied on a computing device. The computing device may be, for example, a server, a desktop computer, a laptop computer, a tablet computer, or any other suitable electronic device, which includes a processor and a memory. In some embodiments, system 101 may include a processor 102, a memory 103, and a storage 104. It is understood that system 101 may also include any other suitable components for performing functions described herein.

In some embodiments, system 101 may have different components in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location or distributed locations. In some embodiments, components of system 101 may be in an integrated device or distributed at different locations but communicate with each other through network 110.

Processor 102 may include any appropriate type of general-purpose or special-purpose microprocessor, digital signal processor, microcontroller, graphics processing unit (GPU). Processor 102 may include one or more hardware units (e.g., portion(s) of an integrated circuit) designed for use with other components or to execute part of a program. The program may be stored on a computer-readable medium, and when executed by processor 102, it may perform one or more functions. Processor 102 may be configured as a separate processor component dedicated to image processing. Alternatively, processor 102 may be configured as a shared processor module for performing other functions unrelated to image processing.

Processor 102 may include several components, such as a query input module 105, a model selection module 106, an intra-modal model module 107 that maintains an intra-modal regression model, and an inter-modal model module 114 that maintains an inter-modal generation model. Although FIG. 1 shows query input module 105, model selection module 106, intra-modal model module 107, and inter-modal model module 114 within a single processor 102, they may alternatively be implemented on different processors located closely or remotely with each other.

Query input module 105, model selection module 106, intra-modal model module 107, and inter-modal model module 114 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform super-resolution image processing. Memory 103 and/or storage 104 may be further configured to store information and data used by processor 102.

Each data source 108 may include one or more storage devices configured to store remote sensing images. The remote sensing images can be captured by image sensors installed in satellites, manned or unmanned aircrafts such as unmanned aerial vehicles (UAVs), hot balloons, etc. For example, a first data source 108 may be a National Agriculture Imagery Program (NAIP) data source and may store remote sensing images with a first source resolution (e.g., 0.6 meters). The remote sensing images from the NAIP data source can be referred to as NAIP images. A second data source 108 may be a Sentinel-2 data source and may store remote sensing images with a second source resolution (e.g., 10 meters). The remote sensing images from the Sentinel-2 data source can be referred to as Sentinel-2 images. The Sentinel-2 images and the NAIP images are free satellite remote sensing images. Although FIG. 1 illustrates that system 101 and data sources 108 are separate from each other, in some embodiments data sources 108 and system 101 can be integrated into a single device. Each of the remote sensing images may include the image data along with the image's location, and the data/time and the modality with which the image was captured.

User device 112 can be a computing device including a processor and a memory. For example, user device 112 can be a desktop computer, a laptop computer, a tablet computer, a smartphone, a game controller, a television (TV) set, a music player, a wearable electronic device such as a smart watch, an Internet-of-Things (IoT) appliance, a smart vehicle, or any other suitable electronic device with a processor and a memory. Although FIG. 1 illustrates that system 101 and user device 112 are separate from each other, in some embodiments user device 112 and system 101 can be integrated into a single device.

In some embodiments, a user may operate on user device 112 and may input a user query through user device 112. User device 112 may send the user query to system 101 through network 110. The user inquiry may include one or more parameters for requesting remote sensing images. The one or more parameters may include, e.g., one or more of a location (or a geographical region-of-interest), a specified time (or a specified time window), and a modality (e.g., a specific optical sensor, etc. The modality may include an indication of a specific satellite (e.g., Sentinel-1, Sentinal-2, etc.) or a specific aircraft (e.g., Aircraft-1, Aircraft-2, etc.), or any other aerial optical sensor without departing from the scope of the present disclosure. The location can be a geographical location or a surface location on Earth. For example, the location can include a longitude and a latitude, an address (e.g., a street, city, state, country, etc.), a place of interest, etc. The optical image captured by the requested modality or by other available modalities may depict a scene or a landscape at the location as seen from above.

Still referring to FIG. 1, when query input module 105 receives a query for an enhanced image of a queried region obtained by a remote sensor at a queried time, it may send the query to model selection module 106. Model selection module 106 may access at least one data source of database 108 to obtain an image dataset associated with the queried region from and the queried time. The image dataset may include the images of the queried region captured via one or more modalities within a time-window associated with the queried time. For example, the images may be captured at the queried time or within a time-window prior to or after the queried time. If there are one or more images in the dataset that are captured using the queried modality (e.g., the optical sensor of interest), model selection module 106 may activate and send the dataset that includes images captured using the optical sensor of interest to the intra-modal model module 107. Otherwise, if the dataset does not include images captured using the queried modality but of the region of interest, model selection module 106 may activate and send the dataset to the inter-modal model module 114. Additional details of the operations performed by the model selection module 106 are provided below in connection with FIG. 2. When the dataset obtained from database 108 includes images with a threshold amount of image occlusion, e.g., such as an aerial image of a city under the cover of fog, these images may be omitted from the dataset. The identification of occluded images may be achieved using various techniques.

Figure 2:
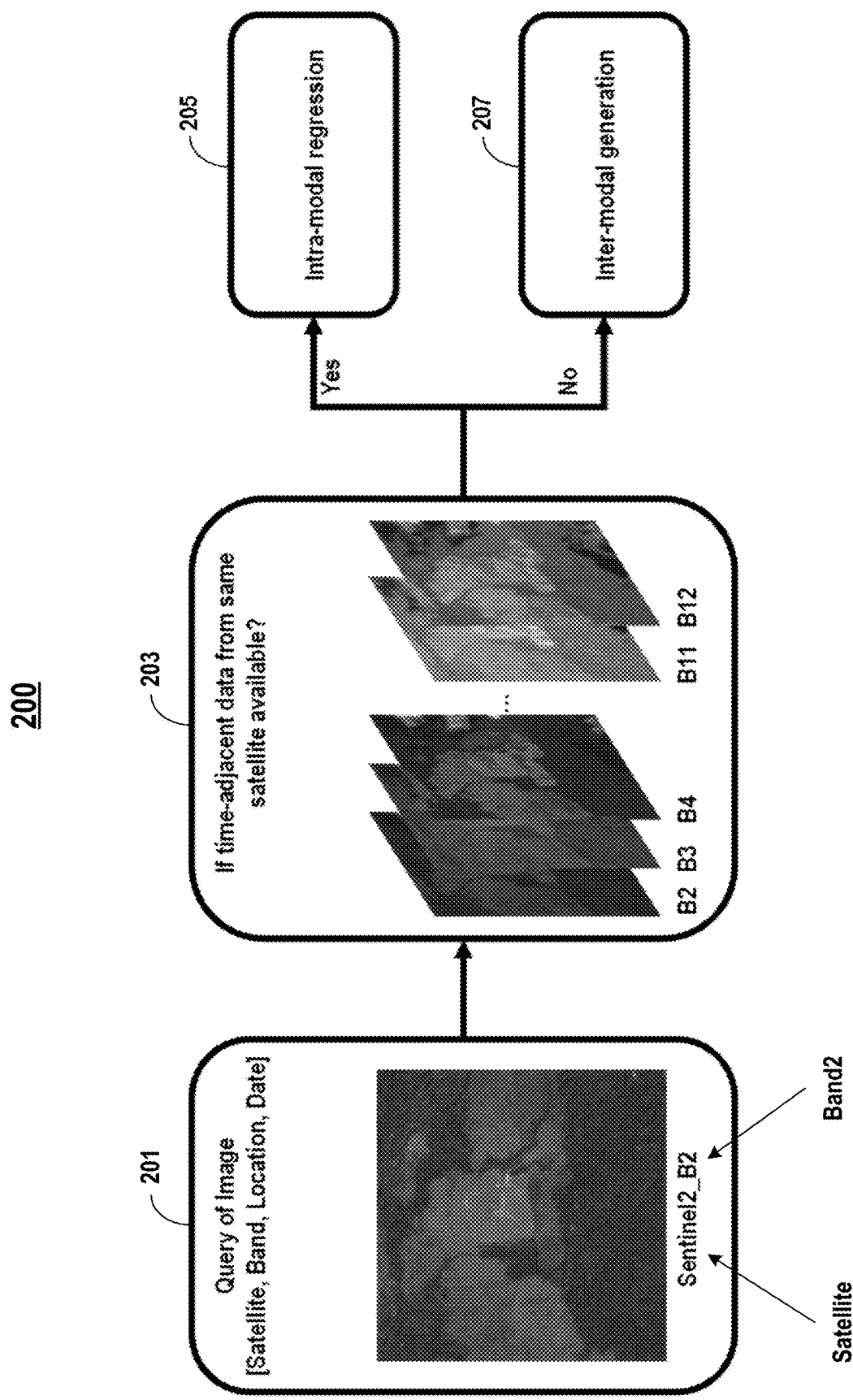
FIG. 2 illustrates a schematic diagram of an exemplary structure of a multi-modal model selection technique, according to embodiments of the disclosure.

FIG. 2 illustrates a schematic diagram of an exemplary structure 200 of a multi-modal model selection technique, according to embodiments of the disclosure. The operations depicted in FIG. 2 will be described in connection with various components detailed above in connection with FIG. 1.

Referring to FIG. 2, query input module 105 may receive (at 201) a query for an image that is associated with a modality (e.g., satellite), spectral band, location, and date, for example. Information associated with the query may be sent to model selection module 106, which obtains a dataset related to the queried location from database 108. Model selection module 106 may determine (at 203) whether the dataset includes one or more images of the queried location captured using the queried modality. If there are images of the queried location captured using the queried modality within a certain time-window that falls before and/or after the queried date, model selection module 106 may select (at 205) the intra-modal regression model. Additional details of the operations performed by the intra-modal regression model are described below in connection with FIG. 3. Otherwise, if the dataset of the queried location does not include images captured using the queried modality, model selection module 106 may select (at 207) the inter-modal generation model. Additional details of the inter-modal generation model are described below in connection with FIG. 4.

Figure 3:
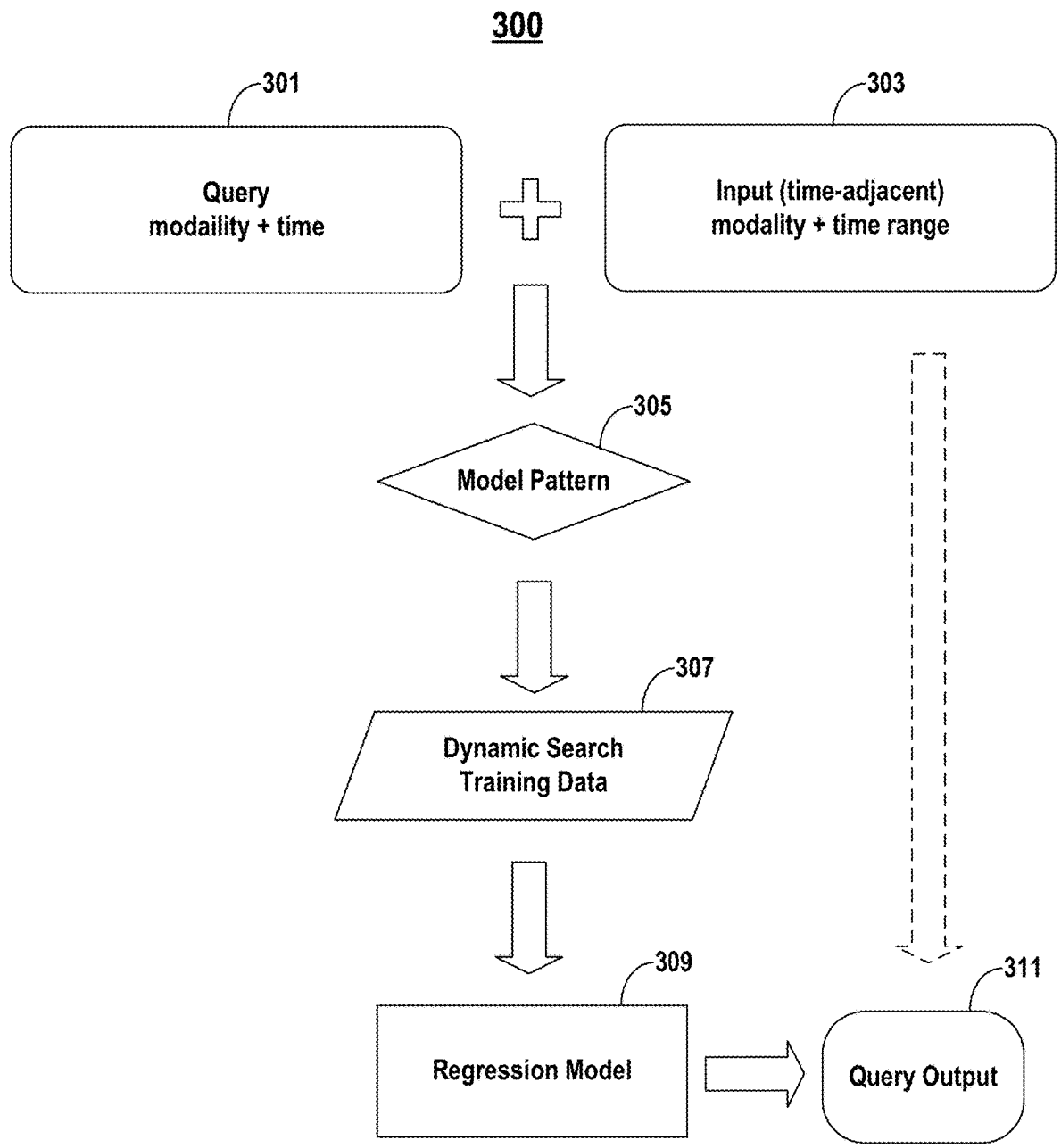
FIG. 3 illustrates a schematic diagram of an exemplary structure of an intra-modal model for image-enhancement, according to embodiments of the disclosure.

FIG. 3 illustrates a schematic diagram of an exemplary structure 300 of an intra-modal model for image-enhancement, according to embodiments of the disclosure. The operations depicted in FIG. 3 will be described in connection with intra-modal model module 107 detailed above in connection with FIG. 1.

Referring to FIG. 3, intra-modal model module 107 may receive (at 301) the queried image captured of a location, using a specific modality, and at a certain time from the model selection module 106. The image dataset that includes images captured of the queried location using the specific modality at various times other than the requested time may be received (at 303) from the model selection module 106. Intra-modal model module 107 may generate (at 305) a regression model pattern that is based on the queried time and the timestamps of the images in the dataset. In some embodiments, the regression model pattern may be considered a list of timestamps.

Using the regression model pattern, intra-modal model module 107 may select (at 307) a training dataset using the regression model pattern. The training dataset may include training data for each timestamp or for a subset of the timestamps in the regression model pattern. The training dataset may be pre-generated using various techniques and is related to one or more of the queried modality, location, time, spectral band, etc. Using the training dataset, intra-modal model module 107 may generate (at 309) a regression model. One example of the regression model may be a boosted tree model (e.g., CatBoost). Then, the image dataset received (at 303) may be input into the generated regression model so that an enhanced image 311 related to the queried image generated. In this way, even when a queried image of a location is not available for the queried time, an enhanced image may be generated using other images captured by the same satellite at different times for the user.

Figure 4:
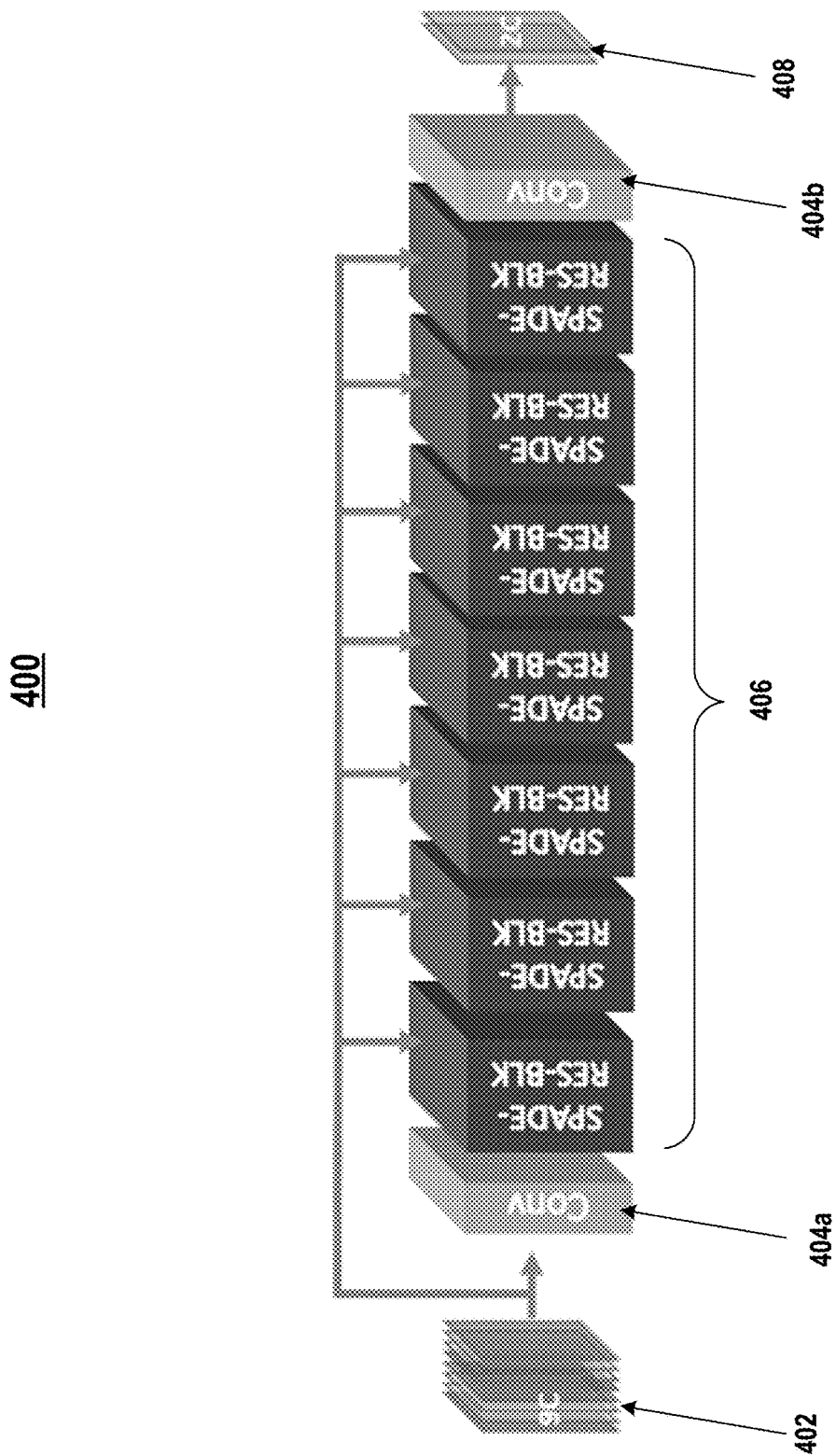
FIG. 4 illustrates a schematic diagram of an exemplary structure of an inter-modal model for image-enhancement, according to embodiments of the disclosure.

FIG. 4 illustrates a schematic diagram of an exemplary structure 400 of an inter-modal model for image-enhancement, according to embodiments of the disclosure. The operations depicted in FIG. 4 will be described in connection with inter-modal model module 114 detailed above in connection with FIG. 1.

Referring to FIG. 4, inter-modal model module 114 may receive a dataset 402 that includes various channels (e.g., feature maps) associated with the images captured using one or more modalities other than the queried modality. In the non-limiting example illustrated in FIG. 4, nine-channels for each image in the dataset would be input into the inter-modal generation model; however, more or fewer than nine channels may be associated with each image depending on which sensor captured those images. The inter-modal generation model depicted in FIG. 4 may include, e.g., a first convolutional layer 404a, one or more residual blocks 406, such as a generational adversarial network (GAN), a SPatially ADaptivE normalization (SPADE) residual block, etc. The output from the set of residual blocks 406 may be a plurality of different channels and/or feature maps associated with the queried modality generated from the input dataset but associated with the queried modality. The output of the set of residual blocks 406 may be passed through a second convolutional layer 404b before output one or more channels and/or feature maps associated with the queried modality so that an enhance image 408 of the queried location, time, and modality may be provided to the user even when an image related to the location/time captured by the queried modality is not available. Although two channels are depicted as the output from the second convolutional layer 404b, more or fewer than two channels may be output depending on the queried modality.

Figure 5:
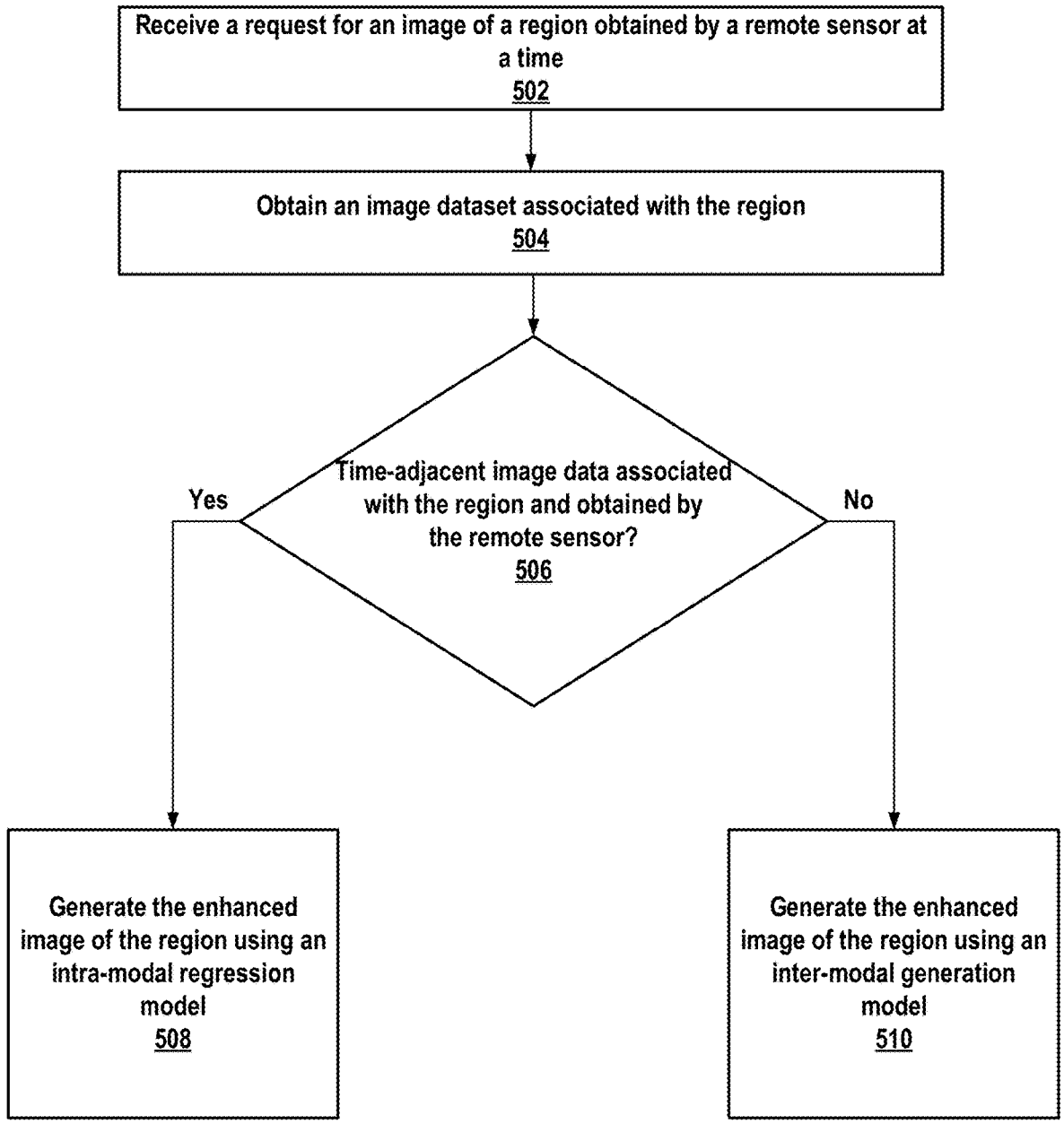
FIG. 5 illustrates a flowchart of an exemplary method of image-enhancement, according to embodiments of the disclosure.

FIG. 5 illustrates a flowchart of an exemplary method 500 of image-enhancement, according to embodiments of the disclosure.

At 502, query input model 105 may receive a request for an image of a region obtained by a remote sensor at a time. For example, referring to FIG. 1, query input module 105 may receive a query/request for an image of a location captured by a specific modality (e.g., satellite, aircraft, etc.). The request for the image may be received via network 110 from user device 112.

At 504, model selection module 106 may obtain an image dataset associated with the region. For example, referring to FIG. 1, when query input module 105 receives the query, it may send the query to model selection module 106. Model selection module 106 may access at least one data source of database 108 to obtain an image dataset associated with the queried region from and the queried time. The image dataset may include the images of the queried region captured via one or more modalities within a time-window associated with the queried time. For example, the images may be captured at the queried time or within a time-window prior to or after the queried time.

At step 506, model selection module 106 may determine whether the dataset includes one or more images captured by the queried satellite within a certain time window (also referred to as "time-adjacent images"). In response to the image dataset including one or more time-adjacent images captured by the satellite indicated in the request, the operations may move to 508; otherwise, if no time-adjacent images captured using the satellite in the request are available, the operations may move to 510. For example, referring to FIG. 1, if there are one or more images in the dataset that are captured using the queried modality (e.g., the optical sensor of interest), model selection module 106 may activate and send the dataset that includes images captured using the optical sensor of interest to the intra-modal model module 107. Otherwise, if the dataset does not include images captured using the queried modality but of the region of interest, model selection module 106 may activate and send the dataset to the inter-modal model module 114.

At 508, intra-modal model module 107 may generate the enhanced image of the region using an intra-modal regression model. For example, referring to FIG. 3, intra-modal model module 107 may receive (at 301) the queried image captured of a location, using a specific modality, and at a certain time from the model selection module 106. The image dataset that includes images captured of the queried location using the specific modality at various times other than the requested time may be received (at 303) from the model selection module 106. Intra-modal model module 107 may generate (at 305) a regression model pattern that is based on the queried time and the timestamps of the images in the dataset. In some embodiments, the regression model pattern may be considered a list of timestamps. Using the regression model pattern, intra-modal model module 107 may select (at 307) a training dataset using the regression model pattern. The training dataset may include training data for each timestamp or for a subset of the timestamps in the regression model pattern. The training dataset may be pre-generated using various techniques and is related to one or more of the queried modality, location, time, spectral band, etc. Using the training dataset, intra-modal model module 107 may generate (at 309) a regression model. One example of the regression model may be a boosted tree model (e.g., CatBoost). Then, the image dataset received (at 303) may be input into the generated regression model so that an enhanced image 408 related to the queried image generated.

In this way, even when a queried image of a location is not available for the queried time, an enhanced image may be generated using other images captured by the same satellite at different times for the user.

At 510, inter-modal model module 114 may generate the enhanced image of the region using an inter-modal generation model. For example, referring to FIG. 4, inter-modal model module 114 may receive a dataset 402 that includes various channels (e.g., feature maps) associated with the images captured using one or more modalities other than the queried modality. In the non-limiting example illustrated in FIG. 4, nine-channels for each image in the dataset would be input into the inter-modal generation model; however, more or fewer than nine channels may be associated with each image depending on which sensor captured those images. The inter-modal generation model depicted in FIG. 4 may include, e.g., a first convolutional layer 404*a*, one or more residual blocks 406, such as a generational adversarial network (GAN), a SPatially ADaptivE normalization (SPADE) residual block, etc. The output from the set of residual blocks 406 may be a plurality of different channels and/or feature maps associated with the queried modality generated from the input dataset but associated with the queried modality. The output of the set of residual blocks 406 may be passed through a second convolutional layer 404*b* before outputting one or more channels and/or feature maps associated with the queried modality so that an enhance image 408 of the queried location, time, and modality may be provided to the user even when an image related to the location/time captured by the queried modality is not available. Although two channels are depicted as the output from the second convolutional layer 404*b*, more or fewer than two channels may be output depending on the queried modality.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, a method of image enhancement is provided. The method may include receiving, by at least one processor, a query for an enhanced image of a queried region obtained by a remote sensor at a queried time. The method may include obtaining, by the at least one processor, an image dataset associated with the queried region from the remote sensor. In response to the image dataset including a plurality of image data associated with the queried region obtained by the remote sensor, the method may include generating, by the at least one processor, the enhanced image of the queried region using an intra-modal regression model.

In some embodiments, the generating, by the at least one processor, the enhanced image of the queried region using the intra-modal regression model may include generating a model pattern based on a first timestamp of the queried time and a second timestamp for each image associated with the queried region.

In some embodiments, the method may include accessing, by the at least one processor, a training database that includes a plurality of training data images of various regions obtained using different remote sensors. In some embodiments, the method may include performing, by the at least one processor, a first training data search associated with the first timestamp of the queried time, as well as the remote sensor and the queried region, and a second training data search associated with the second timestamp for each image in the image dataset associated with the queried region and the remote sensor. In some embodiments, the method may include selecting, by the at least one processor, a training dataset based on the first training data search and the second training data search associated with the queried region.

In some embodiments, the method may include identifying, by the at least one processor, whether any images in the training dataset includes one or more occluded images of the queried region. In some embodiments, the method may include discarding, by the at least one processor, the one or more occluded images of the queried region from the training dataset.

In some embodiments, the method may include generating, by at least one processor, the intra-modal regression model based on the first training data search and the second training data search associated with the queried region.

In some embodiments, the method may include inputting, by the at least one processor, the image dataset associated with the queried region from the remote sensor into the intra-modal regression model. In some embodiments, the method may include receiving, by the at least one processor, the enhanced image of the queried region associated with the queried time and associated with the remote sensor based on an output of the intra-modal regression model.

In some embodiments, in response to the image dataset including a plurality of image data associated with the queried region obtained by different remote sensors, the method may include generating, by the at least one processor, the enhanced image of the queried region using an inter-modal generation model.

In some embodiments, accessing, by the at least one processor, a training database that includes a plurality of training data images of various regions obtained using the different remote sensors. In some embodiments, the method may include performing, by the at least one processor, a training data search for a training data set associated with the queried region captured at any time by any of the different remote sensors. In some embodiments, the method may include selecting, by the at least one processor, a training dataset that includes training data of the queried region captured at different time by the different remote sensors. In some embodiments, the training dataset may not be associated with a modality of the remote sensor of the query.

In some embodiments, the method may include, inputting, by the at least one processor, the training dataset into the inter-modal generation model. In some embodiments, the inter-modal generation model may include one or more convolutional layers or residual blocks. In some embodiments, the method may include receiving, by the at least one processor, the enhanced image of the queried region associated with the queried time and associated with a modality of the remote sensor from the query as an output of the inter-modal generation model.

In some embodiments, the training dataset may be associated with a first modality or a second modality. In some embodiments, in response to the inter-modal generation model receiving the training dataset associated with the first modality, the method may include generating, by the at least one processor, the enhanced image of the second modality of the queried time and region as an output of the inter-modal generation model. In some embodiments, in response to the inter-modal generation model receiving the training dataset associated with the second modality, the method may include generating, by the at least one processor, the enhanced image of the first modality of the queried time and region as the output of the inter-modal generation model.

According to another aspect of the present disclosure, an apparatus for image enhancement is provide. The apparatus may include at least one processor. The apparatus may include a memory storing instructions which, when executed by at least one processor, cause the at least one processor to perform receiving a query for an enhanced image of a queried region obtained by a remote sensor at a queried time. The apparatus may include the memory storing instructions which, when executed by at least one processor, cause the at least one processor to perform obtaining an image dataset associated with the queried region from the remote sensor. The apparatus may include the memory storing instructions which, when executed by at least one processor, cause the at least one processor to perform in response to the image dataset including a plurality of image data associated with the queried region obtained by the remote sensor, generating the enhanced image of the queried region using an intra-modal regression model.

In some embodiments, the memory stores instructions which, when executed by the at least one processor, may cause the at least one processor to perform the generating the enhanced image of the queried region using the intra-modal regression model by generating a model pattern based on a first timestamp of the queried time and a second timestamp for each image associated with the queried region.

In some embodiments, the memory stores instructions which, when executed by the at least one processor, may further cause the at least one processor to perform accessing a training database that includes a plurality of training data images of various regions obtained using different remote sensors. In some embodiments, the memory stores instructions which, when executed by the at least one processor, may further cause the at least one processor to perform performing a first training data search associated with the first timestamp of the queried time, as well as the remote sensor and the queried region, and a second training data search associated with the second timestamp for each image in the image dataset associated with the queried region and the remote sensor. In some embodiments, the memory stores instructions which, when executed by the at least one processor, may further cause the at least one processor to perform selecting a training dataset based on the first training data search and the second training data search associated with the queried region.

In some embodiments, the memory stores instructions which, when executed by the at least one processor, may further cause the at least one processor to perform identifying whether any images in the training dataset includes one or more occluded images of the queried region. In some embodiments, the memory stores instructions which, when executed by the at least one processor, may further cause the at least one processor to perform discarding the one or more occluded images of the queried region from the training dataset.

In some embodiments, the memory stores instructions which, when executed by the at least one processor, may further cause the at least one processor to perform generating the intra-modal regression model based on the first training data search and the second training data search associated with the queried region.

In some embodiments, the memory stores instructions which, when executed by the at least one processor, may further cause the at least one processor to perform inputting the image dataset associated with the queried region from the remote sensor into the intra-modal regression model. In some embodiments, the memory stores instructions which, when executed by the at least one processor, may further cause the at least one processor to perform receiving the enhanced image of the queried region associated with the queried time and associated with the remote sensor based on an output of the intra-modal regression model.

In some embodiments, the memory stores instructions which, when executed by the at least one processor, may further cause the at least one processor to perform, in response to the image dataset including a plurality of image data associated with the queried region obtained by different remote sensors, generating the enhanced image of the queried region using an inter-modal generation model. In some embodiments, the memory stores instructions which, when executed by the at least one processor, may further cause the at least one processor to perform accessing a training database that includes a plurality of training data images of various regions obtained using the different remote sensors. In some embodiments, the memory stores instructions which, when executed by the at least one processor, may further cause the at least one processor to perform performing a training data search for a training data set associated with the queried region captured at any time by any of the different remote sensors. In some embodiments, the memory stores instructions which, when executed by the at least one processor, may further cause the at least one processor to perform selecting a training dataset that includes training data of the queried region captured at different times by the different remote sensors. In some embodiments, the training dataset may not be associated with a modality of the remote sensor of the query.

In some embodiments, the memory stores instructions which, when executed by the at least one processor, may further cause the at least one processor to perform inputting the training dataset into the inter-modal generation model, the inter-modal generation model including one or more convolutional layers or residual blocks. In some embodiments, the memory stores instructions which, when executed by the at least one processor, may further cause the at least one processor to perform receiving the enhanced image of the queried region associated with the queried time and associated with a modality of the remote sensor from the query as an output of the inter-modal generation model.

In some embodiments, the training dataset is associated with a first modality or a second modality. In some embodiments, the memory stores instructions which, when executed by the at least one processor, may further cause the at least one processor to perform, in response to the inter-modal generation model receiving the training dataset associated with the first modality, generating the enhanced image of the second modality of the queried time and region as an output of the inter-modal generation model. The memory stores instructions which, when executed by the at least one processor, may further cause the at least one processor to perform, in response to the inter-modal generation model receiving the training dataset associated with the second modality, generating the enhanced image of the first modality of the queried time and region as the output of the inter-modal generation model.

According to a further aspect of the present disclosure, a non-transitory computer-readable medium storing instructions for image enhancement generation is provided. The instructions, when executed by at least one processor, may cause the at least one processor to perform receiving a query for an enhanced image of a queried region obtained by a remote sensor at a queried time. The instructions, when executed by at least one processor, may cause the at least one processor to perform obtaining an image dataset associated with the queried region from the remote sensor. The instructions, when executed by at least one processor, may cause the at least one processor to perform, in response to the image dataset including a plurality of image data associated with the queried region obtained by the remote sensor, generating the enhanced image of the queried region using an intra-modal regression model. The instructions, when executed by at least one processor, may cause the at least one processor to perform, in response to the image dataset including a plurality of image data associated with the queried region obtained by different remote sensors, generating, by the at least one processor, the enhanced image of the queried region using an inter-modal generation model.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method of image enhancement, comprising:
receiving, by at least one processor, a query for an enhanced image of a queried region obtained by a remote sensor at a queried time;
obtaining, by the at least one processor, an image dataset associated with the queried region from the remote sensor;
in response to the image dataset including a plurality of image data associated with the queried region obtained by the remote sensor, generating, by the at least one processor, the enhanced image of the queried region using an intra-modal regression model, comprising generating a model pattern based on a first timestamp of the queried time and a second timestamp for each image associated with the queried region;
accessing, by the at least one processor, a training database that includes a plurality of training data images of various regions obtained using different remote sensors;
performing, by the at least one processor, a first training data search associated with the first timestamp of the queried time, as well as the remote sensor and the queried region, and a second training data search associated with the second timestamp for each image in the image dataset associated with the queried region and the remote sensor; and
selecting, by the at least one processor, a training dataset based on the first training data search and the second training data search associated with the queried region.

2. The method of claim 1, further comprising:
identifying, by the at least one processor, whether any images in the training dataset includes one or more occluded images of the queried region; and
discarding, by the at least one processor, the one or more occluded images of the queried region from the training dataset.

3. The method of claim 1, further comprising:
generating, by at least one processor, the intra-modal regression model based on the first training data search and the second training data search associated with the queried region.

4. The method of claim 3, further comprising:
inputting, by the at least one processor, the image dataset associated with the queried region from the remote sensor into the intra-modal regression model; and
receiving, by the at least one processor, the enhanced image of the queried region associated with the queried time and associated with the remote sensor based on an output of the intra-modal regression model.

5. The method of claim 1, further comprising:
in response to the image dataset including a plurality of image data associated with the queried region obtained by different remote sensors, generating, by the at least one processor, the enhanced image of the queried region using an inter-modal generation model.

6. The method of claim 5, further comprising:
accessing, by the at least one processor, a training database that includes a plurality of training data images of various regions obtained using the different remote sensors;
performing, by the at least one processor, a training data search for a training data set associated with the queried region captured at any time by any of the different remote sensors; and
selecting, by the at least one processor, a training dataset that includes training data of the queried region captured at different time by the different remote sensors, wherein the training dataset is not associated with a modality of the remote sensor of the query.

7. The method of claim 6, further comprising:
inputting, by the at least one processor, the training dataset into the inter-modal generation model, the inter-modal generation model including one or more convolutional layers or residual blocks; and
receiving, by the at least one processor, the enhanced image of the queried region associated with the queried time and associated with a modality of the remote sensor from the query as an output of the inter-modal generation model.

8. The method of claim 7, wherein:
the training dataset is associated with a first modality or a second modality,
in response to the inter-modal generation model receiving the training dataset associated with the first modality, generating, by the at least one processor, the enhanced image of the second modality of the queried time and region as an output of the inter-modal generation model, and
in response to the inter-modal generation model receiving the training dataset associated with the second modality, generating, by the at least one processor, the enhanced image of the first modality of the queried time and region as the output of the inter-modal generation model.

9. An apparatus for image enhancement, comprising:
at least one processor;
a memory storing instructions which, when executed by the at least one processor, cause the at least one processor to perform:
receiving a query for an enhanced image of a queried region obtained by a remote sensor at a queried time;
obtaining an image dataset associated with the queried region from the remote sensor;

in response to the image dataset including a plurality of image data associated with the queried region obtained by the remote sensor, generating the enhanced image of the queried region using an intra-modal regression model, comprising generating a model pattern based on a first timestamp of the queried time and a second timestamp for each image associated with the queried region;

accessing a training database that includes a plurality of training data images of various regions obtained using different remote sensors;

performing a first training data search associated with the first timestamp of the queried time, as well as the remote sensor and the queried region, and a second training data search associated with the second timestamp for each image in the image dataset associated with the queried region and the remote sensor; and selecting a training dataset based on the first training data search and the second training data search associated with the queried region.

10. The apparatus of claim 9, wherein the memory storing instructions which, when executed by the at least one processor, cause the at least one processor to perform:

identifying whether any images in the training dataset includes one or more occluded images of the queried region; and discarding the one or more occluded images of the queried region from the training dataset.

11. The apparatus of claim 9, wherein the memory storing instructions which, when executed by the at least one processor, cause the at least one processor to perform:

generating the intra-modal regression model based on the first training data search and the second training data search associated with the queried region.

12. The apparatus of claim 11, wherein the memory storing instructions which, when executed by the at least one processor, cause the at least one processor to perform:

inputting the image dataset associated with the queried region from the remote sensor into the intra-modal regression model; and receiving the enhanced image of the queried region associated with the queried time and associated with the remote sensor based on an output of the intra-modal regression model.

13. The apparatus of claim 9, wherein the memory storing instructions which, when executed by the at least one processor, cause the at least one processor to perform:

in response to the image dataset including a plurality of image data associated with the queried region obtained by different remote sensors, generating the enhanced image of the queried region using an inter-modal generation model;

accessing a training database that includes a plurality of training data images of various regions obtained using the different remote sensors;

performing a training data search for a training data set associated with the queried region captured at any time by any of the different remote sensors; and selecting a training dataset that includes training data of the queried region captured at different times by the different remote sensors, wherein the training dataset is not associated with a modality of the remote sensor of the query.

14. The apparatus of claim 13, wherein the memory storing instructions which, when executed by the at least one processor, cause the at least one processor to perform:

inputting the training dataset into the inter-modal generation model, the inter-modal generation model including one or more convolutional layers or residual blocks; and receiving the enhanced image of the queried region associated with the queried time and associated with a modality of the remote sensor from the query as an output of the inter-modal generation model.

15. The apparatus of claim 14, wherein:

the training dataset is associated with a first modality or a second modality, in response to the inter-modal generation model receiving the training dataset associated with the first modality, generating the enhanced image of the second modality of the queried time and region as an output of the inter-modal generation model, and in response to the inter-modal generation model receiving the training dataset associated with the second modality, generating the enhanced image of the first modality of the queried time and region as the output of the inter-modal generation model.

16. A non-transitory computer-readable medium storing instructions which, when executed by at least one processor, cause the at least one processor to perform:

receiving a query for an enhanced image of a queried region obtained by a remote sensor at a queried time;

obtaining an image dataset associated with the queried region from the remote sensor;

in response to the image dataset including a plurality of image data associated with the queried region obtained by the remote sensor, generating the enhanced image of the queried region using an intra-modal regression model, comprising generating a model pattern based on a first timestamp of the queried time and a second timestamp for each image associated with the queried region;

accessing a training database that includes a plurality of training data images of various regions obtained using different remote sensors;

performing a first training data search associated with the first timestamp of the queried time, as well as the remote sensor and the queried region, and a second training data search associated with the second timestamp for each image in the image dataset associated with the queried region and the remote sensor;

selecting a training dataset based on the first training data search and the second training data search associated with the queried region; and in response to the image dataset including a plurality of image data associated with the queried region obtained by different remote sensors, generating, by the at least one processor, the enhanced image of the queried region using an inter-modal generation model.

* * * * *